United States Patent
Takada et al.

[11] Patent Number: 5,958,281
[45] Date of Patent: Sep. 28, 1999

[54] LITHIUM ION-CONDUCTIVE SOLID ELECTROLYTE AND METHOD FOR PRODUCING THE SAME

[75] Inventors: Kazunori Takada, Osaka; Kazuya Iwamoto, Sakai; Shigeo Kondo, Hirakata; Nobuhiko Ikeda; Kazutomi Yamamoto, both of Higashikurume; Toshikatsu Uematsu, Kokubunji, all of Japan

[73] Assignee: Matsushita Electric Industrial Co., Ltd., Osaka-fu, Japan

[21] Appl. No.: 08/833,208

[22] Filed: Apr. 14, 1997

[30] Foreign Application Priority Data

Apr. 16, 1996 [JP] Japan .................................. 8-094225

[51] Int. Cl.$^6$ ...................................................... H01M 4/36
[52] U.S. Cl. .................... 252/62.2; 429/191; 423/561.1; 423/566.2; 423/565; 423/562
[58] Field of Search .............................. 423/566.2, 561.1, 423/565, 562; 252/62.2; 429/191

[56] References Cited

U.S. PATENT DOCUMENTS 3,321,326  5/1967  Young et al. ............................ 423/565
4,465,746  8/1984  Akridge ................................... 429/191

FOREIGN PATENT DOCUMENTS 0 469 574 A1  2/1992  European Pat. Off. .
3841222  6/1990  Germany ............................. 423/561.1
6-263422  9/1994  Japan .
7-330312  12/1995  Japan .

*Primary Examiner*—Melissa Koslow
*Attorney, Agent, or Firm*—McDermott, Will & Emery

[57] ABSTRACT

A method for producing an electrochemically advantageous lithium ion-conductive solid electrolyte with high ionic conductivity, low electronic conduction and electrochemical stability is disclosed. The method comprises the steps of synthesizing lithium sulfide by reacting lithium hydroxide with a gaseous sulfur source at a temperature of not less than 130° C. and not more than 445° C., thermally melting plural compounds containing at least silicon sulfide and the synthesized lithium sulfide, and cooling the molten mixture. The silicon sulfide is synthesized by the steps of adding a silicon powder to molten sulfur while stirring to disperse the silicon powder in the molten sulfur and heating the silicon powder-dispersed sulfur in a reaction chamber under reduced pressure.

6 Claims, No Drawings

LITHIUM ION-CONDUCTIVE SOLID ELECTROLYTE AND METHOD FOR PRODUCING THE SAME

BACKGROUND OF THE INVENTION

The present invention relates to a method for producing a lithium ion-conductive solid electrolyte for solid state lithium batteries.

Recently, with the development of portable equipment such as personal computers, handy phones and the like, there is a great demand for a battery as a power source therefor. Particularly, a lithium battery has been studied vigorously in various fields, because lithium is a substance having a small atomic weight and a high ionization energy, thereby to give the lithium battery a high energy density.

On the other hand, the conventional battery used for such equipment includes a liquid electrolyte, and has the problem of possible leakage of the electrolyte. In order to increase reliability of the battery by solving the above-mentioned problem and realize a compact and thin element, many attempts have been made in various fields to realize a solid state battery by including a solid electrolyte, instead of a liquid electrolyte. The lithium battery, in particular, has a high energy density and includes therein an electrolyte containing an organic inflammable solvent. This poses a problem of a risk of ignition or the like inside the battery cell in case of a fault of the battery. This is why there is a demand for a development of the solid state lithium battery including a solid electrolyte comprising a nonflammable solid material.

Known examples of the solid electrolyte for such battery are lithium halides, lithium nitrides, lithium oxysalts, their derivatives, or the like. Under the circumstances, however, these solid electrolytes have a problem that their ionic conductivity is too low or their potential window is too narrow to apply to a battery for practical use. For this reason, these solid electrolytes are at present substantially precluded from applications to the battery for practical use.

By contrast, lithium ion-conductive solid electrolytes composed of a sulfide glass, such as $Li_2S$—$SiS_2$, $Li_2S$—$P_2S_5$, $Li_2S$—$B_2S_3$ and the like, and a sulfide glass doped with a lithium halide such as $LiI$ or a lithium oxysalt such as $Li_3PO_4$ and the like have an ionic conductivity of as high as $10^{-4}$ to $10^{-3}$ S/cm, and are expected to be applied to a battery.

The sulfide glasses are prepared by mixing a glass forming material such as $SiS_2$, $P_2S_5$, $B_2S_3$ and the like with a glass modifier $LiS_2$ and thermally melting the mixture, followed by quenching. Particularly, since $SiS_2$ included in a solid electrolyte of $Li_2S$—$SiS_2$ system is a sulfide having a higher boiling point than that of $P_2S_5$ and $B_2S_3$, thermal melting of the glass material under a closed atmosphere is unnecessary. This makes the solid electrolyte including $SiS_2$ one of the most suitable materials for mass synthesis.

The following are the known methods of synthesizing the lithium sulfide as a starting material of the $Li_2S$—$SiS_2$ system solid electrolyte:

L-1: To heat lithium sulfate in the presence of an organic substance such as sucrose or starch in an inert gas atmosphere or under reduced pressure thereby to reduce the lithium sulfate;

L-2: To heat lithium sulfate in the presence of carbon black or powdered graphite in an inert gas atmosphere or under reduced pressure thereby to reduce the lithium sulfate;

L-3: To thermally decompose a lithium hydrogensulfide-ethanol in a hydrogen stream; and L-4: To heat metal lithium in the presence of hydrogen sulfide or sulfur vapor under normal pressure or under pressure thereby to cause their direct reaction.

The following are the known methods of synthesizing the silicon sulfide as another starting material of the $Li_2S$—$SiS_2$ system solid electrolyte:

S-1: To react silicon oxide with aluminum sulfide in an inert gas atmosphere;

S-2: To thermally decompose an organic compound of silicon; and

S-3: To react hydrogen sulfide and silicon in a hydrogen gas atmosphere.

However, the $Li_2S$—$SiS_2$ system solid electrolyte prepared from the starting materials of the lithium sulfide and the silicon sulfide obtained by the above-mentioned conventional methods of synthesis has the following drawbacks:

First, in the methods of L-1 and L-2, an organic substance such as sucrose or starch or a carbon material such as carbon black or powdered graphite is added in excess in order to cause complete reduction of the lithium sulfate. As a result, carbon resulting from thermal decomposition of the organic substance or carbon material added is liable to remain in the resultant lithium sulfide. Besides, while lithium sulfate is hydrophilic, carbon black or powdered graphite, and carbon resulting from the thermal decomposition of the organic substance are lipophilic. This renders it difficult to disperse both substances homogeneously, resulting in unsatisfactory reduction of the lithium sulfate. Furthermore, a large amount of carbon is likely to remain in the resultant lithium sulfide. Therefore, if the lithium sulfide synthesized by the above-mentioned methods of L-1 and L-2 is used as the starting material for the solid electrolyte, carbon remains in the resultant electrolyte, and the solid electrolyte has undesirable electronic conduction which should not exist in it.

In the method of L-3, since preparation of the starting material lithium hydrogensulfide-ethanol is complicated and costs so much, this material per se does not seem to be applicable as a material for the battery.

The method of L-4 where metal lithium is directly reacted with hydrogen sulfide or vaporized sulfur has a problem that since the reaction is explosive and proceeds at high temperature, it must be performed at low temperature. As a result, the reaction proceeds only on a surface or in the vicinity of metallic lithium, and the metallic lithium tends to remain in the synthesized lithium sulfide. If such lithium sulfide is used as the starting material of the solid electrolyte, the metallic lithium remains in the resultant electrolyte, and undesirable electronic conduction is prone to occur in the electrolyte. Furthermore, if such electrolyte is included in the solid state lithium battery, an electrode active material is reduced by the residual metallic lithium, rendering it difficult to obtain desired battery characteristics.

Next, silicon sulfides synthesized by the methods of S-1 to S-3 will be described.

First, if the solid electrolyte is prepared from the silicon sulfide synthesized by the method of S-1, the manufacturing cost becomes high because the cost of aluminum sulfide is relatively high. Moreover, aluminum oxide remains in the resultant solid electrolyte. Since aluminum oxide is an electrically insulating substance, the resultant electrolyte has low ionic conductivity.

Similarly, the use of the silicon sulfide synthesized by the method of S-2 for the solid electrolyte has a similar problem of high manufacturing cost of the solid electrolyte, because the starting material, organic silicon compound, is costly.

The method of S-3 has a problem that since the synthesis of silicon sulfide is performed at a high temperature of not lower than 1200° C., the reaction chamber is damaged, facilitating migration of components of the chamber into the synthesized silicon sulfide. If the silicon sulfide synthesized by this method is included in the solid electrolyte, the chamber components are contained as an impurity in the resultant solid electrolyte. As a result, oxidation-reduction of the impurity may occur, thereby to cause adverse effects on the electrochemical characteristics of the solid electrolyte, such as decreased decomposition voltage.

BRIEF SUMMARY OF THE INVENTION

The object of the present invention is to solve the above-mentioned problems and provide a lithium ion-conductive solid electrolyte having exceptional electrochemical characteristics.

The present invention provides a method for producing a lithium ion-conductive solid electrolyte comprising the steps of synthesizing lithium sulfide by reacting lithium hydroxide with a gaseous sulfur source at a temperature in a range of not less than 130° C. and not more than 445° C., thermally melting plural compounds containing at least silicon sulfide and the synthesized lithium sulfide in an inert atmosphere, and cooling the molten mixture.

The present invention also uses silicon sulfide synthesized by the steps of adding a silicon powder to molten sulfur while stirring to disperse the silicon powder in the molten sulfur and heating the silicon powder-dispersed sulfur in a reaction chamber under reduced pressure.

In a preferred mode of the present invention, hydrogen sulfide or sulfur vapor containing hydrogen is used as a gaseous sulfur source to cause reaction with lithium hydroxide thereby to obtain lithium sulfide.

In another preferred mode of the present invention, silicon and sulfur as the starting materials of silicon sulfide are mixed in a molar ratio of 1:2.2 to 1:3.6.

In still another preferred mode of the present invention, the silicon powder-dispersed sulfur is heated at a temperature of not less than 400° C. and not more than 800° C. in a reaction chamber under reduced pressure.

According to the present invention, it is possible to realize a lithium ion-conductive solid electrolyte having exceptional electrochemical characteristics, such as high ionic conductivity and low electronic conduction.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In one mode of the present invention, hydrogen sulfide or sulfur vapor containing hydrogen as the gaseous sulfur source is reacted with lithium hydroxide to obtain synthetic lithium sulfide. The following chemical formula (1) represents the reaction between the hydrogen sulfide as the gaseous sulfur source and lithium hydroxide to obtain lithium sulfide.

$$2LiOH + H_2S \rightarrow Li_2S + 2H_2O \quad (1)$$

As shown by the formula, carbon or metallic elements do not remain in the resultant lithium sulfide, unlike the lithium sulfide synthesized by the conventional methods. As a result, it becomes possible to have a solid electrolyte completely free from carbon or metallic elements as an impurity.

If the reaction temperature is below 130° C., the reaction proceeds extremely slow, and lithium hydroxide is liable to remain in the reaction product. If the lithium sulfide synthesized at a reaction temperature lower than 130° C. is used as the starting material of the solid electrolyte, lithium hydroxide remains in the resultant solid electrolyte as an impurity, thereby to decrease ionic conductivity of the electrolyte. Furthermore, hydroxyl groups other than lithium ions participate in the electrochemical reaction in the solid electrolyte, which results in a decrease in decomposition voltage of the solid electrolyte. Moreover, such solid electrolyte is used to fabricate the solid state lithium battery, it becomes difficult to expect a battery having desired electrochemical characteristics because of lithium ion-proton exchange between the hydroxyl groups and the electrode active material.

If the reaction temperature is higher than 445° C., the lithium hydroxide is molten, and mutual adhesion of the lithium hydroxide particles may occur to form a mass, which interferes with progression of the reaction. As a result, lithium hydroxide is liable to remain in the reaction product similarly. The solid electrolyte having the lithium sulfide synthesized in this way has the same problem as discussed above.

Therefore, in order to prepare the lithium ion-conductive solid electrolyte from plural compounds containing at least lithium sulfide and silicon sulfide, the lithium sulfide is preferably synthesized by reacting lithium hydroxide with a gaseous sulfur source at a temperature of not less than 130° C. and not more than 445° C., more preferably not less than 300° C. and not more than 400° C.

Reaction between the lithium hydroxide and the gaseous sulfur source is categorized as solid-gas reaction. An effective means for accelerating the solid-gas reaction is to increase a surface area of the solid phase. For this reason, a particle diameter of lithium hydroxide is preferably not more than 1.5 mm, more preferably not more than 1.2 mm.

On the other hand, water generated in the above-mentioned chemical formula (1) is removed with the dynamic gaseous sulfur source. However, if the particle diameter of lithium hydroxide is too small, the lithium hydroxide is carried on water and discharged together with an exhaust gas from the reaction system. Therefore, the particle diameter of lithium hydroxide is preferably not less than 0.1 mm, more preferably not less than 0.7 mm.

Suitable gaseous sulfur source is hydrogen sulfide from the point of ease of handling and a mixed gas of vaporized sulfur and hydrogen from the point of recycling of the exhaust gas.

Next, when silicon is reacted with sulfur to synthesize silicon sulfide, a silicon powder is previously added to molten sulfur while stirring to make the surface of the silicon powder fully coated with sulfur, which promotes reaction between silicon and sulfur at low temperatures. As a result, possible migration of the components of the reaction chamber materials in the course of synthesis of silicon sulfide can be prevented, and the solid electrolyte including the silicon sulfide thus synthesized can have favorable characteristics. Accordingly, silicon sulfide used for producing the lithium ion-conductive solid electrolyte from plural compounds containing at least lithium sulfide and silicon sulfide is preferably synthesized by the steps of adding a silicon powder to molten sulfur while stirring to disperse the silicon powder in molten sulfur and heating the resultant silicon powder-dispersed sulfur placed in a reaction chamber under reduced pressure.

If the reaction between silicon and sulfur is performed using a small mixing ratio of sulfur, the surface of the silicon powder is not fully coated with sulfur, and the reaction does not start at low temperatures. If the ratio of sulfur is excess, a large amount of sulfur must be removed after the reaction. Accordingly, in order to obtain silicon sulfide by reacting silicon with sulfur, silicon is mixed with sulfur preferably in a molar ratio of 1:2.2 to 1:3.6.

If the reaction chamber under reduced pressure is heated at a temperature lower than 400° C., the reaction between silicon and sulfur does not start. As a result, a massive amount of silicon remains in the reaction product. If the silicon sulfide synthesized at such low temperature is included in the solid electrolyte, the resultant electrolyte shows electronic conduction due to the presence of silicon in the electrolyte. Whereas, if the reaction temperature is higher than 800° C., sintering of silicon occurs during the reaction, which arrests the reaction at the level of the surface of the sintered silicon. As a result, silicon remains inside the silicon powder and the solid electrolyte including the silicon sulfide synthesized at a temperature higher than 800° C. shows electronic conduction similarly. Accordingly, the temperature for heating the reaction chamber under reduced pressure is preferably not less than 400° C. and not more than 800° C., more preferably not less than 500° C. and not more than 700° C.

When the lithium ion-conductive solid electrolyte is prepared from plural compounds containing at least lithium sulfide and silicon sulfide, concomitant use of lithium sulfide and silicon sulfide synthesized by the above-mentioned methods can give a solid electrolyte having exceptional electrochemical characteristics.

In the following, the present invention will be described more specifically, with reference to the embodiments.

EXAMPLE 1

In the present example, an oxysulfide glass represented by the formula $0.01Li_3PO-0.63Li_2S-0.36SiS_2$ was synthesized as a lithium ion-conductive solid electrolyte prepared from plural compounds containing various lithium sulfides and silicon sulfides, and the electrochemical characteristics were evaluated. The details will be described below.

First, lithium sulfide was synthesized in the below-mentioned manner:

A stainless steel porous plate having plural 0.5 mm-size pores was installed at a central part of a hard glass tube having an inner diameter of 15 mm and a length of 200 mm. A fluidized bed reaction layer upward the porous plate of the glass tube was filled with lithium hydroxide monohydrate classified to 0.7 to 1.2 mm size particles, which was then heated at 250° C. while introducing an argon gas from beneath the porous plate at a rate of 1000 ml/min to remove water adsorbed to the lithium hydroxide and water of crystallization. Then, the gas was changed to hydrogen sulfide and the reaction was continued for 60 min, which gave lithium sulfide.

Next, silicon sulfide was synthesized in the below-mentioned manner:

350 g of sulfur having a purity of 99.9999% was weighed and placed in a 500 ml stainless steel vessel. The vessel was then placed in an oil bath at a maintained temperature of 125° C. to cause thermal melting of sulfur. Then, 100 g of a silicon powder having a purity of 99.9999% was weighed and added to molten sulfur while stirring. The stirring was continued for 1 hour to wet the surface of the silicon powder with molten sulfur, thereby to obtain silicon powder-dispersed molten sulfur. After the vessel was picked up from the oil bath and cooled, the substance contained in the vessel was roughly pulverized and filled in a silica vessel, which was then evacuated and sealed close-tightly. A part of the sealed vessel was heated in an electric furnace at 470° C. and the remaining part at 700° C. for 150 hours, respectively. After the vessel was cooled, the substance contained in the vessel was harvested, which gave silicon sulfide.

Comparative Examples

Subsequently, for comparison, lithium sulfides and silicon sulfides were synthesized using the conventionally known methods.
[Synthesis of lithium sulfide]

Li-1: Lithium sulfate was mixed with sucrose and heated for 5 hours at 900° C. in an argon gas stream.

Li-2: Lithium sulfate was mixed with carbon black and heated for 5 hours at 900° C. in an argon gas stream.

Li-3: Lithium hydrogensulfide-ethanol ($2LiHS-C_2H_5OH$) was heated for 2 hours at 300° C. in a hydrogen gas stream.

Li-4: Metallic lithium was mixed with sulfur and heated at 115° C. in an argon gas stream.
[Synthesis of silicon sulfide]

Si-1: A mixture of silicon oxide and aluminum sulfide was placed in an alumina crucible, which was then heated for 150 hours at 1300° C. in a nitrogen gas stream.

Si-2: Silicon and sulfur were sealed in a silica tube under reduced pressure and heated for 150 hours at 1200° C.

Lithium ion-conductive solid electrolytes were prepared using the lithium sulfides and silicon sulfides synthesized in this way.

Lithium sulfide, silicon sulfide and lithium phosphate were weighed and mixed in a molar ratio of 63:36:1. Lithium phosphate used was a commercially available lithium phosphate. The mixture was filled in a glassy carbon crucible and thermally molten at 1000° C. for 2 hours in an argon gas stream. The molten mixture was cooled by rapid-quenching method using a twin roller, which gave a lithium ion-conductive solid electrolyte.

Measurements of ionic conductivity and electrochemical stability, that is, potential-current characteristics of the resultant solid electrolytes were investigated to evaluate electrochemical characteristics of the electrolytes.

Ionic conductivity of the solid electrolyte was measured by an AC impedance method, using electrodes prepared by applying a carbon paste to both ends of the solid electrolyte shaped in ribbon-like form. The cell for measurement of the potential-current characteristic was prepared as follows: A powder obtained by pulverizing the solid electrolyte glass was pressed at 3 tons/cm$^2$ to a pellet having a diameter of 10 mm and a thickness of 3 mm. A metallic lithium foil was pressed onto one surface of the pellet as a reversible electrode. A platinum plate was pressed onto the opposite surface as an ion-blocking electrode. The cell was gradually polarized up to 8 V (vs. Li$^+$/Li) at a sweep rate of 5 mV/sec and the potential-current behavior was recorded.

Table 1 lists the results of ionic conductivity measurement and Table 2 lists those of the oxidation current at 8 V during the potential sweep. These results indicate an ionic conductivity of $1\times10^{-3}$ S/cm or more for all the solid electrolytes. However, the oxidation current value was larger in the solid electrolytes obtained from the lithium sulfides or silicon sulfides synthesized by the conventional methods than those from the lithium sulfide and silicon sulfide synthesized in accordance with the present invention, which suggested the presence of electronic conduction or decomposition by oxidation of the solid electrolytes of the comparative examples.

Based on the above results, it was found that according to the present invention, it is possible to obtain a lithium ion-conductive solid electrolyte having exceptional electrochemical characteristics free from electronic conduction or decomposition by oxidation of the solid electrolyte.

TABLE 1

| Ionic conductivity ($\times 10^{-3}$ S/cm) | | Lithium sulfide | | | | |
|---|---|---|---|---|---|---|
| | | Example 1 | Li-1 | Li-2 | Li-3 | Li-4 |
| Silicon sulfide | Example 1 | 1.8 | 1.3 | 1.3 | 1.5 | 1.2 |
| | Si-1 | 1.4 | 1.1 | 1.2 | 1.3 | 1.0 |
| | Si-2 | 1.5 | 1.1 | 1.3 | 1.0 | 1.1 |

TABLE 2

| Oxidation current ($\mu$A) | | Lithium sulfide | | | | |
|---|---|---|---|---|---|---|
| | | Example 1 | Li-1 | Li-2 | Li-3 | Li-4 |
| Silicon sulfide | Example 1 | 0.24 | 0.61 | 0.79 | 0.42 | 0.57 |
| | Si-1 | 0.86 | 1.52 | 2.09 | 0.94 | 1.22 |
| | Si-2 | 0.55 | 1.31 | 1.52 | 0.72 | 1.63 |

EXAMPLE 2

In the present example, another oxysulfide glass represented by the formula $0.01Li_3PO_4$–$0.63Li_2S$–$0.36SiS_2$ was synthesized as a lithium ion-conductive solid electrolyte prepared from plural compounds containing various lithium sulfides and silicon sulfides, and the electrochemical characteristics were evaluated. A mixed gas of hydrogen and vaporized sulfur was used here as the gaseous sulfur source for synthesis of lithium sulfide, instead of hydrogen sulfide used in Example 1. The details will be described below.

First, lithium sulfide was synthesized in the below-mentioned manner:

A stainless steel porous plate having plural 0.5 mm-size pores was installed at a central part of a hard glass tube having an inner diameter of 15 mm and a length of 200 mm. A fluidized bed reaction layer upward the porous plate of the glass tube was filled with lithium hydroxide monohydrate classified to 0.7 to 1.2 mm size particles and sulfur was further placed on the bottom of the porous plate. A hydrogen gas diluted with argon was introduced from beneath the fluidized bed reaction layer so as to place the fluidized bed reaction layer in a mixed gas atmosphere of hydrogen and sulfur vapor while heating at 350° C. The reaction was continued for 60 min, which gave lithium sulfide.

Then, a lithium ion-conductive solid electrolyte was prepared in the same manner as in Example 1, using the lithium sulfide thus synthesized or lithium sulfide synthesized in the comparative example (Li-2) and silicon sulfide synthesized in Example 1 or silicon sulfide synthesized in the comparative example (Si-2).

Ionic conductivity and potential-current characteristic of the resultant solid electrolytes were investigated in the same manner as in Example 1 to evaluate electrochemical characteristics of the electrolyte.

Table 3 lists the results of ionic conductivity measurement and Table 4 lists those of the oxidation current at the polarization of the potential sweep. These results indicate an ionic conductivity of $1 \times 10^{-3}$ S/cm or more for all the solid electrolytes. However, the oxidation current value was larger in the solid electrolytes obtained from the lithium sulfide or silicon sulfide synthesized by the conventional methods than those obtained from the lithium sulfide and silicon sulfide synthesized in accordance with the present invention, which suggested the presence of electronic conduction and decomposition by oxidation of the solid electrolytes of the comparative examples.

Based on the above results, it was found that according to the present invention, it is possible to obtain a lithium ion-conductive solid electrolyte having exceptional electrochemical characteristics free from electronic conduction or decomposition by oxidation of the solid electrolyte.

TABLE 3

| Ionic conductivity ($\times 10^{-3}$ S/cm) | | Lithium sulfide | |
|---|---|---|---|
| | | Example 2 | Li-2 |
| Silicon sulfide | Example 1 | 1.5 | 1.3 |
| | Si-2 | 1.1 | 1.1 |

TABLE 4

| Oxidation current ($\mu$A) | | Lithium sulfide | |
|---|---|---|---|
| | | Example 2 | Li-2 |
| Silicon sulfide | Example 1 | 0.21 | 0.61 |
| | Si-2 | 0.56 | 1.21 |

EXAMPLE 3

In the present example, a sulfide glass represented by the formula $0.60Li_2S$–$0.40SiS_2$ was synthesized as a lithium ion-conductive solid electrolyte prepared from plural compounds containing various lithium sulfides and silicon sulfides, and electrochemical characteristics of the resultant electrolytes were evaluated. The details will be described below.

Lithium ion-conductive solid electrolytes were prepared in the manner as described below, using the lithium sulfides synthesized in Example 1 and the comparative example (Li-2) and the silicon sulfides synthesized in Example 1 and the comparative example (Si-2).

Lithium sulfide and silicon sulfide were weighed and mixed in a molar ratio of 60:40. The resultant mixture was filled in a glassy carbon crucible, which was then thermally molten at 1000° C. in an argon gas stream for 2 hours. Subsequently, the molten mixture was dropped in liquid nitrogen, which gave a lithium ion-conductive solid electrolyte.

For the resultant solid electrolytes, ionic conductivity was measured and potential-current characteristic was investigated in the same manner as in Example 1 to evaluate electrochemical characteristics of the electrolytes.

Table 5 lists the results of ionic conductivity measurement and Table 6 lists those of the oxidation current at 8 V during the potential sweep. These results indicate no apparent difference in the ionic conductivity between the respective solid electrolytes. However, the oxidation current value was larger in the solid electrolytes obtained from the lithium sulfide or silicon sulfide synthesized by the conventional methods than those obtained from the lithium sulfide and silicon sulfide synthesized in accordance with the present invention, which suggested the presence of electronic conduction and decomposition by oxidation of the solid electrolytes of the comparative examples.

From the above results, it was found that according to the present invention, it is possible to obtain a lithium ion-conductive solid electrolyte having exceptional electrochemical characteristics free from electronic conduction or decomposition by oxidation of the solid electrolyte.

TABLE 5

| Ionic conductivity | | Lithium sulfide | |
|---|---|---|---|
| ($\times 10^{-3}$ S/cm) | | Example 1 | Li-2 |
| Silicon sulfide | Example 1 | 0.68 | 0.52 |
| | Si-2 | 0.48 | 0.44 |

TABLE 6

| Oxidation current | | Lithium sulfide | |
|---|---|---|---|
| ($\mu$A) | | Example 1 | Li-2 |
| Silicon sulfide | Example 1 | 0.20 | 0.54 |
| | Si-2 | 0.77 | 1.01 |

EXAMPLE 4

In the present example, an oxysulfide glass represented by the formula $0.05Li_2O–0.60Li_2S–0.35SiS_2$ was synthesized as a lithium ion-conductive solid electrolyte prepared from plural compounds containing various lithium sulfides and silicon sulfides, and electrochemical characteristics of the resultant electrolytes were evaluated. The details will be described below.

Lithium ion-conductive solid electrolytes were prepared in the manner as described below, using the lithium sulfides synthesized in Example 1 and the comparative example (Li-2) and the silicon sulfides synthesized in Example 1 and the comparative example (Si-2). Lithium oxide used was a commercially available extra fine lithium oxide.

Lithium sulfide, silicon sulfide and lithium oxide were weighed and mixed in a molar ratio of 60:35:5. The resultant mixture was filled in a glassy carbon crucible, which was then thermally molten at 1000° C. in a nitrogen gas stream for 2 hours. The molten mixture was cooled by the rapid-quenching method using a twin roller as in Example 1, which gave a lithium ion-conductive solid electrolyte.

Ionic conductivity and potential-current characteristic of the resultant solid electrolytes were investigated in the same manner as in Example 1 to evaluate electrochemical characteristics of the electrolytes.

Table 7 lists the results of ionic conductivity measurement and Table 8 lists those of the oxidation current at 8 V during the potential sweep. These results indicate an ionic conductivity of $1\times10^{-3}$ S/cm or more for all the solid electrolytes. However, the oxidation current value was larger in the solid electrolytes using the lithium sulfide or silicon sulfide synthesized by the conventional methods than those using the lithium sulfide and silicon sulfide synthesized in accordance with the present invention, which suggested the presence of electronic conduction and decomposition by oxidation of the solid electrolytes of the comparative examples.

Based on the above results, it was found that +according to the present invention, it is possible to obtain a lithium ion-conductive solid electrolyte having exceptional electrochemical characteristics free from electronic conduction or decomposition by oxidation of the solid electrolyte.

TABLE 7

| Ionic conductivity | | Lithium sulfide | |
|---|---|---|---|
| ($\times 10^{-3}$ S/cm) | | Example 1 | Li-2 |
| Silicon sulfide | Example 1 | 1.3 | 1.1 |
| | Si-2 | 1.1 | 0.97 |

TABLE 8

| Oxidation current | | Lithium sulfide | |
|---|---|---|---|
| ($\mu$A) | | Example 1 | Li-2 |
| Silicon sulfide | Example 1 | 0.22 | 0.69 |
| | Si-2 | 0.83 | 1.12 |

EXAMPLE 5

In the present example, a sulfide glass represented by the formula $0.60Li_2S–0.35SiS_2–0.05B_2S_3$ was synthesized as a lithium ion-conductive solid electrolyte prepared from plural compounds containing various lithium sulfides and silicon sulfides, and electrochemical characteristics of the resultant electrolytes were evaluated. The details will be described below.

Lithium ion-conductive solid electrolytes were prepared in the manner as described below, using the lithium sulfides synthesized in Example 1 and the comparative example (Li-2) and the silicon sulfides synthesized in Example 1 and the comparative example (Si-2).

Lithium sulfide, silicon sulfide and boron sulfide were weighed and mixed in a molar ratio of 60:35:5. The boron sulfide used was a commercially available extra fine boron sulfide. The resultant mixture was sealed in a silica tube under reduced pressure and thermally molten for 2 hours at 1000° C. Subsequently, the silica tube was placed in water and quenched, which gave a lithium ion-conductive solid electrolyte.

Ionic conductivity and potential-current characteristic of the resultant solid electrolytes were investigated in the same manner as in Example 1 to evaluate electrochemical characteristics of the electrolytes.

Table 9 lists the results of ionic conductivity measurement and Table 10 lists those of the oxidation current at 8 V during the potential sweep. These results indicate no apparent difference in the ionic conductivity between the respective solid electrolytes. However, the oxidation current value was larger in the solid electrolytes obtained from the lithium sulfide or silicon sulfide synthesized by the conventional methods than those obtained from the lithium sulfide and silicon sulfide synthesized in accordance with the present invention, which suggested the presence of electronic conduction or decomposition by oxidation of the solid electrolytes of the comparative examples.

Based on the above results, it was found that according to the present invention, it is possible to obtain a lithium ion-conductive solid electrolyte having exceptional electrochemical characteristics free from electronic conduction or decomposition by oxidation of the solid electrolyte.

TABLE 9

| Ionic conductivity ($\times 10^{-3}$ S/cm) | | Lithium sulfide | |
|---|---|---|---|
| | | Example 1 | Li-2 |
| Silicon sulfide | Example 1 | 0.55 | 0.49 |
| | Si-2 | 0.52 | 0.48 |

TABLE 10

| Oxidation current ($\mu A$) | | Lithium sulfide | |
|---|---|---|---|
| | | Example 1 | Li-2 |
| Silicon sulfide | Example 1 | 0.21 | 0.49 |
| | Si-2 | 0.72 | 0.81 |

TABLE 11

| Ionic conductivity ($\times 10^{-3}$ S/cm) | | Lithium sulfide | |
|---|---|---|---|
| | | Example 1 | Li-2 |
| Silicon sulfide | Example 1 | 0.43 | 0.38 |
| | Si-2 | 0.36 | 0.32 |

TABLE 12

| Oxidation current ($\mu A$) | | Lithium sulfide | |
|---|---|---|---|
| | | Example 1 | Li-2 |
| Silicon sulfide | Example 1 | 0.23 | 0.51 |
| | Si-2 | 0.64 | 0.74 |

EXAMPLE 6

In the present example, a sulfide glass represented by the formula $0.60Li_2S-0.35SiS_2-0.05P_2S_5$ was synthesized as a lithium ion-conductive solid electrolyte prepared from plural compounds containing various lithium sulfides and silicon sulfides, and electrochemical characteristics of the resultant electrolytes were evaluated. The details will be described below.

Lithium ion-conductive solid electrolytes were prepared in the manner as described below, using the lithium sulfides synthesized in Example 1 and the comparative example (Li-2) and the silicon sulfides synthesized in Example 1 and the comparative example (Si-2).

Lithium sulfide, silicon sulfide and phosphorus sulfide were weighed and mixed in a molar ratio of 60:35:5. The phosphorus sulfide used was a commercially available phosphorus sulfide. The resultant mixture was sealed in a silica tube under reduced pressure and thermally molten for 2 hours at 1000° C. Subsequently, the silica tube was placed in water and quenched, which gave a lithium ion-conductive solid electrolyte.

Ionic conductivity and potential-current characteristic of the resultant solid electrolytes were investigated in the same manner as in Example 1 to evaluate electrochemical characteristics of the electrolytes.

Table 11 lists the results of ionic conductivity measurement and Table 12 lists those of the oxidation current at 8 V during the potential sweep. These results indicated no apparent difference in the ionic conductivity between the respective solid electrolytes. However, the oxidation current value was larger in the solid electrolytes obtained from the lithium sulfide or silicon sulfide synthesized by the conventional methods than those obtained from the lithium sulfide and silicon sulfide synthesized in accordance with the present invention, which suggested the presence of electronic conduction or decomposition by oxidation of the solid electrolytes of the comparative examples.

Based on the above results, it was found that according to the present invention, it is possible to obtain a lithium ion-conductive solid electrolyte having exceptional electrochemical characteristics free from electronic conduction or decomposition by oxidation of the solid electrolyte.

EXAMPLE 7

In the present example, an oxysulfide glass represented by the formula $0.01Li_3PO_4-0.63Li_2S-0.36SiS_2$ was synthesized as a lithium ion-conductive solid electrolyte prepared from plural compounds containing lithium sulfides synthesized by reacting lithium hydroxide with a gaseous sulfur source at various temperatures and silicon sulfide, and electrochemical characteristics of the resultant electrolytes were evaluated. The details will be described below.

Lithium sulfide was synthesized in the same manner as in Example 1, except that after the gas was changed to hydrogen sulfide, the heating temperature was set at 100, 150, 200, 300, 400 or 450° C. Silicon sulfide synthesized in Example 1 was used here. Lithium phosphate used was a commercially available extra fine lithium phosphate. Lithium ion-conductive solid electrolytes were prepared in the same manner as in Example 1, using the lithium sulfides, silicon sulfide and lithium phosphate.

Ionic conductivity and potential-current characteristic of the resultant solid electrolytes were investigated in the same manner as in Example 1 to evaluate electrochemical characteristics of the electrolytes.

Table 13 lists the results of ionic conductivity measurement and oxidation current at a polarization of 8 V during the potential sweep. The results indicated that according to the present invention using a heating temperature of not less than 130° C. and not more than 445° C. for synthesis of lithium sulfide, it is possible to obtain a lithium ion-conductive solid electrolyte having exceptional electrochemical characteristics, showing high ionic conductivity and free from electronic conduction or decomposition by oxidation of the solid electrolyte.

TABLE 13

| Heating temperature of lithium sulfide (° C.) | Ionic conductivity ($\times 10^{-3}$ S/cm) | Oxidation current ($\mu A$) |
|---|---|---|
| 100 | 0.0024 | 0.11 |
| 150 | 1.1 | 0.20 |
| 200 | 1.6 | 0.21 |
| 300 | 1.8 | 0.22 |
| 400 | 1.8 | 0.19 |
| 450 | 0.051 | 0.23 |

EXAMPLE 8

In the present example, an oxysulfide glass represented by the formula $0.01Li_3PO_4-0.63Li_2S-0.36SiS_2$ was synthesized as a lithium ion-conductive solid electrolyte prepared from plural compounds containing lithium sulfide synthesized by reacting lithium hydroxide with a gaseous sulfur source and silicon sulfides synthesized by heating silicon powder-dispersed sulfur at various temperatures, and electrochemical characteristics of the resultant electrolytes were evaluated. The details will be described below.

Silicon sulfide was synthesized in the same manner as in Example 1, except that after evacuating the silica tube containing silicon powder-dispersed sulfur, the tube was heated at 300° C. or 400° C., or a part of the tube was heated at 470° C. and the remaining part at 700° C. or 800° C. or 900° C. each for 150 hours. Lithium sulfide synthesized in Example 1 was used here. Lithium phosphate used was a commercially available lithium phosphate. Lithium ion-conductive solid electrolytes were prepared in the same manner as in Example 1, using these lithium sulfide, silicon sulfides and lithium phosphate.

Ionic conductivity and potential-current characteristic of the resultant solid electrolytes were investigated in the same manner as in Example 1 to evaluate electrochemical characteristics of the electrolytes.

Table 14 lists the results of ionic conductivity measurement and oxidation current at 8 V during the potential sweep. The silicon sulfide synthesized at a heating temperature of 300° C. failed to give a glassy solid electrolyte, and the obtained substance showed electronic conduction. This may be because a large amount of silicon remained in the synthesized silicon sulfide. The solid electrolyte obtained from the silicon sulfide synthesized at a heating temperature of 900° C. contains a black impurity and the potential-current characteristic shows a large current value, presumably due to electronic conduction caused by the impurity. This indicated that silicon remained in the synthesized silicon sulfide.

Based on the above results, it was found that according to the present invention which uses a heating temperature of not less than 400° C. and not more than 800° C. after the steps of adding a silicon powder to molten sulfur while stirring to disperse silicon in the molten sulfur and pressure-reducing the reaction chamber, it is possible to obtain a lithium ion-conductive solid electrolyte having exceptional electrochemical characteristics, showing high ionic conductivity and free from electronic conduction or decomposition by oxidation of the solid electrolyte.

TABLE 14

| Heating temperature of silicon sulfide (° C.) | Ionic conductivity ($\times 10^{-3}$ S/cm) | Oxidation current ($\mu$A) |
|---|---|---|
| 400 | 1.0 | 0.20 |
| 700 | 1.8 | 0.24 |
| 800 | 1.3 | 0.30 |
| 900 | 0.96 | 21.0 |

EXAMPLE 9

In the present example, an oxysulfide glass represented by the formula $0.01Li_3PO_4$–$0.63Li_2S$–$0.36SiS_2$ was synthesized as a lithium ion-conductive solid electrolyte prepared from plural compounds containing lithium sulfide synthesized by reacting lithium hydroxide with a gaseous sulfur source and silicon sulfides synthesized by heating a mixture of a silicon powder and sulfur in various mixing ratios at 700° C., and electrochemical characteristics of the resultant electrolytes were evaluated. The details will be described below.

Silicon sulfide was synthesized in the same manner as in Example 1, except that silicon was mixed with sulfur in a weight ratio of 100 g to 200 g (molar ratio=1:1.75), 100 g to 300 g (molar ratio=1:2.63), 100 g to 400 g (molar ratio= 1:3.5) and 100 g to 500 g (molar ratio=1:4.38). Lithium sulfide synthesized in Example 1 was used here. Lithium phosphate used was a commercially available extra fine lithium phosphate. Lithium ion-conductive solid electrolytes were prepared in the same manner as in Example 1, using the lithium sulfide, silicon sulfides and lithium phosphate.

Ionic conductivity and potential-current characteristic of the resultant solid electrolytes were investigated in the same manner as in Example 1 to evaluate electrochemical characteristics of the electrolytes.

Table 15 lists the results of ionic conductivity measurement and oxidation current at 8 V during the potential sweep. The solid electrolyte obtained from the silicon sulfide synthesized at a weight ratio of 100 g:200 g showed a low ionic conductivity of $0.75 \times 10^{-3}$ S/cm and a relatively high oxidation current value. In this solid electrolyte, a black impurity, presumably nonreacted silicon remaining in the synthesized silicon sulfide, was observed. The solid electrolyte including the silicon sulfide synthesized at a weight ratio of 100 g:500 g had so many crystallized parts. This may be because a large amount of sulfur remained in the synthesized silicon sulfide, which was then weighed as a starting material at the time of synthesis of the solid electrolyte, whereby the amount of silicon sulfide as a glass forming material remaining in the starting material became less than an intended amount. This shortage of silicon sulfide may have resulted in partial crystallization of the solid electrolyte. Similarly, low ionic conductivity of the solid electrolyte may have resulted from the presence of rich crystalline in the solid electrolyte.

Based on the above results, it was found that according to the present invention which uses the mixing ratio of silicon to sulfur of 1:2.2 to 1:3.6 (molar ratio), it is possible to obtain a lithium ion-conductive solid electrolyte having exceptional electrochemical characteristics, showing high ionic conductivity and free from electronic conduction or decomposition by oxidation of the solid electrolyte.

TABLE 15

| Mixed amount of sulfur (g) | Ionic conductivity ($\times 10^{-3}$ S/cm) | Oxidation current ($\mu$A) |
|---|---|---|
| 200 | 0.75 | 0.65 |
| 300 | 1.8 | 0.24 |
| 400 | 1.3 | 0.30 |
| 500 | 0.28 | 0.36 |

The above-mentioned examples disclosed specific examples of the lithium ion-conductive solid electrolyte, such as $0.01Li_3PO_4$–$0.63Li_2S$–$0.36SiS_2$, synthesized from plural compounds containing at least lithium sulfide and silicon sulfide. The present invention is also effective for other lithium ion-conductive solid electrolytes having different compositions from those of the foregoing examples, e.g., $Li_3BO_3$—$Li_2S$—$SiS_2$, $Li_2S$—$SiS_2$—$GeS_2$, LiI—$Li_2S$—$SiS_2$ and the like which were not mentioned in the foregoing examples. The present invention is therefore not limited to the lithium ion-conductive solid electrolytes as given in the foregoing examples.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A method for producing a lithium ion-conductive solid electrolyte comprising the steps of:

synthesizing lithium sulfide by reacting lithium hydroxide with a gaseous sulfur source at a temperature in a range of not less than 130° C. and not more than 445° C., wherein said reacting is performed using a solid-gas process, thermally melting plural compounds containing at least silicon sulfide and said synthesized lithium sulfide in an inert atmosphere, and cooling said molten mixture.

2. The method for producing a lithium ion-conductive solid electrolyte in accordance with claim 1, wherein said silicon sulfide is synthesized by the steps of:

adding a silicon powder to molten sulfur while stirring to obtain a silicon powder-dispersed molten sulfur, and heating said silicon powder-dispersed molten sulfur in a reaction chamber under pressure, wherein said silicon powder-dispersed sulfur is heated in a reaction chamber under less than atmosphere pressure at a temperature of not less than 400° C. and not more than 800° C.

3. The method for producing a lithium ion-conductive solid electrolyte in accordance with claim 1, wherein said gaseous sulfur source is hydrogen sulfide or sulfur vapor containing hydrogen.

4. The method for producing a lithium ion-conductive solid electrolyte in accordance with claim 2, wherein said silicon powder is mixed with sulfur in a molar ratio of 1:2.2 to 1:3.6.

5. A method for producing a lithium ion-conductive solid electrolyte comprising the steps of:

adding a silicon powder to molten sulfur while stirring to obtain a silicon powder-dispersed molten sulfur, synthesizing silicon sulfide by heating said silicon powder-dispersed sulfur in a reaction chamber under reduced pressure, wherein said silicon powder-dispersed sulfur is heated in a reaction chamber under less than atmosphere pressure at a temperature of not less than 400° C. and not more than 800° C., thermally melting plural compounds containing at least lithium sulfide and said synthesized silicon sulfide in an inert atmosphere, and cooling said molten mixture.

6. The method for producing a lithium ion-conductive solid electrolyte in accordance with claim 5, wherein said silicon powder is mixed with sulfur in a molar ratio of 1:2.2 to 1:3.6

* * * * *

UNITED STATES PATENT AND TRADEMARK OFFICE
CERTIFICATE OF CORRECTION

PATENT NO. : 5,958,281
DATED : September 28, 1999
INVENTOR(S) : Takada, et. al.

It is certified that error appears in the above-indentified patent and that said Letters Patent is hereby corrected as shown below:

On the cover page:

Item [73], Assignee: after "Matsushita Electric Industrial Co., Ltd., Osaka-fu, Japan" insert --and Furukawa Co., Ltd. Tokyo, Japan--.

In the Abstract section, after "C" delete ".".

Claim 1, line 5, after "130°C" delete "."; and after "445°C" delete ".".

Claim 2, line 9, "atmosphere" to --atmospheric--.

Claim 5, line 9, change "atmosphere" to --atmospheric--;
line 10, after "400°C" delete "."; and
line 11, after "800°C" delete ".".

Signed and Sealed this

Thirteenth Day of March, 2001

*Attest:*

NICHOLAS P. GODICI

*Attesting Officer*  *Acting Director of the United States Patent and Trademark Office*